(12) United States Patent
Ferris

(10) Patent No.: US 6,268,791 B1
(45) Date of Patent: Jul. 31, 2001

(54) SWITCH GAUGE

(75) Inventor: Gregory Matthew Ferris, Cedar Falls, IA (US)

(73) Assignee: Engineered Products Company, Waterloo, IA (US)

(*) Notice: Subject to any disclaimer, the term of this patent is extended or adjusted under 35 U.S.C. 154(b) by 0 days.

(21) Appl. No.: 09/310,621

(22) Filed: May 12, 1999

(51) Int. Cl.[7] .................................................. G60Q 1/00
(52) U.S. Cl. ..................... 340/438; 340/607; 340/611; 116/268; 116/DIG. 25
(58) Field of Search .................................... 340/438, 461, 340/626, 607, 611, 606; 116/264, 266, 268, 272, 281, DIG. 25; 454/158, 146; 73/721, 746

(56) References Cited

U.S. PATENT DOCUMENTS

| | | | | |
|---|---|---|---|---|
| 3,963,891 | * | 6/1976 | De Magondeaux | 200/308 |
| 4,445,456 | * | 5/1984 | Nelson | 116/268 |
| 5,693,926 | * | 12/1997 | Cassidy | 340/607 |
| 5,850,183 | * | 12/1998 | Berry | 340/607 |

* cited by examiner

Primary Examiner—Daniel J. Wu
Assistant Examiner—Anh La
(74) Attorney, Agent, or Firm—Oppenheimer Wolff & Donnelly LLP

(57) ABSTRACT

An air filter restriction indicating device communicating with the supply of air passing from an air filter to the air intake of an internal combustion engine. The indicating device senses a decrease in the supply of air drawn through the air filter by the engine based upon changes in the amount of vacuum in the negative side of the air supply, the amount of restriction being indicated by the movement of an indicating device. Improved means included in the indicating device senses the movement of the indicating device and progressively locks the indicating device into various indicating positions as the vacuum increases due to an increased restriction of the filter, so that the maximum reading of restriction achieved during engine operation remains visible to the operator or maintenance personnel even after the engine is turned off. Further, an electronic signal is sent to a dashboard mounted signaling device, such as a light or buzzer, to indicate to the vehicle operator that air filter maintenance is required.

21 Claims, 6 Drawing Sheets

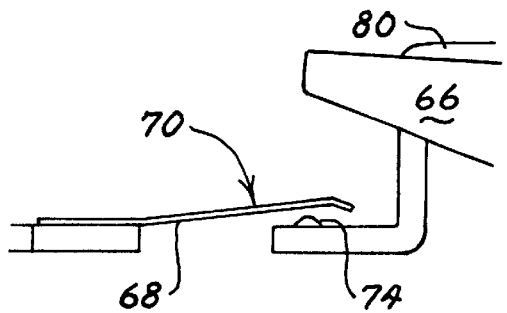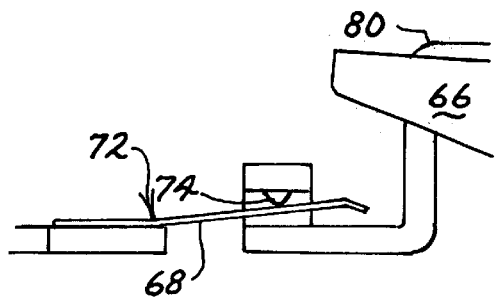
FIG. 10   FIG. 11
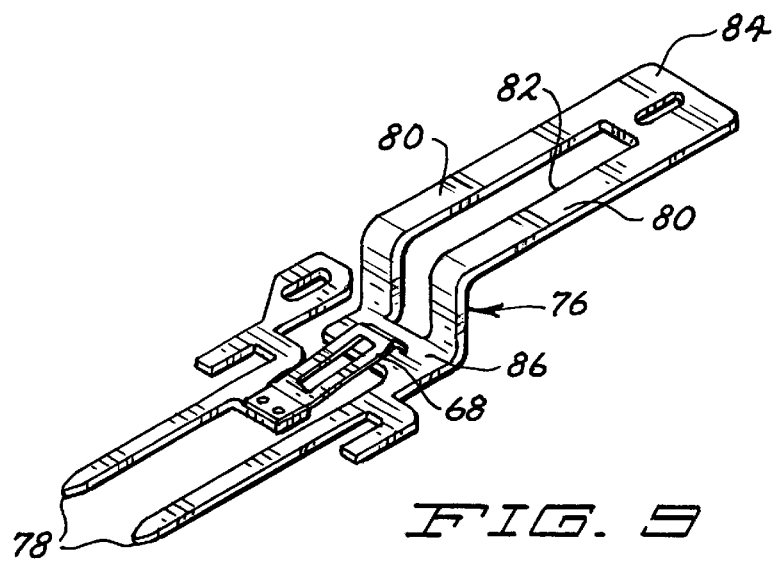
FIG. 9
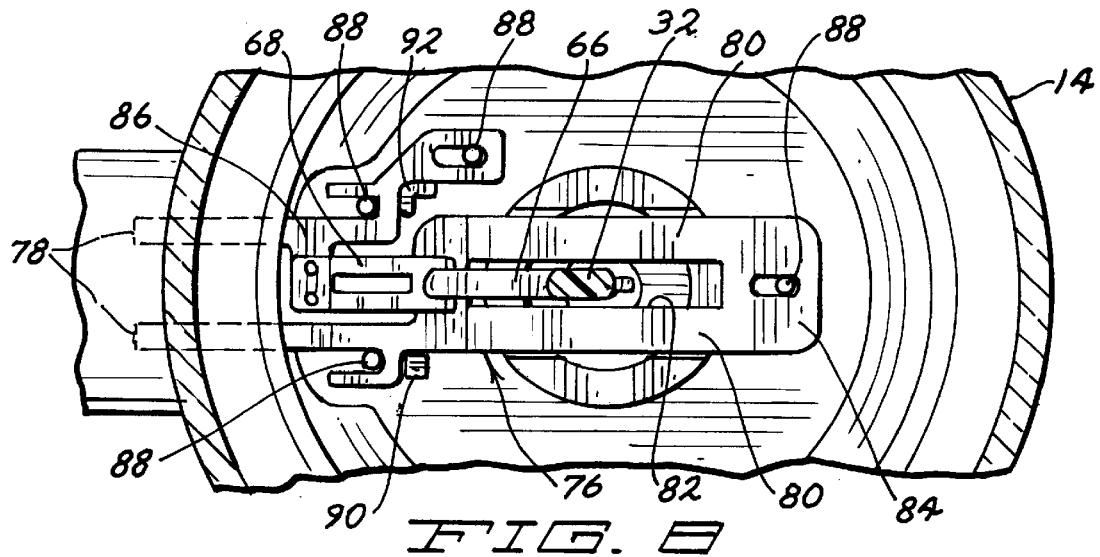
FIG. 8

SWITCH GAUGE

BACKGROUND OF THE INVENTION

The present invention relates generally to a mechanical filter gauge for determining the filtering capability of a vehicle filter, and in particular to a mechanical gauge for measuring and displaying the functionality of a vehicle's air filter.

The improved device of the present invention is used in connection with an air filter for internal combustion engines. It is particularly useful for application to turbocharged diesel engines on trucks, tractors and industrial and marine applications. The device indicates and locks itself in position, and activates a signaling device on the vehicle dashboard, when the air filter has become so loaded with contaminants that the supply of air required by the engine for its operating efficiency is not being drawn through the filter and that the filter therefore requires cleaning or replacement. It also locks itself in various positions to provide a continuous indication as to how much useful life remains in the air filter before is should be cleaned or changed.

The use of a gauge to monitor the filtering ability of a vehicle's air filter is known in the art. However, the prior art combination of such a gauge with a switch to positively actuate a dashboard indicator light of the filter's condition, without flickering or giving an otherwise unclear signal, based on the status of the gauge, is new in the art. In particular, the dashboard light signal could sometimes light before the gauge actually reached "redline," or the point at which the air filter required replacement. Further, the dashboard light signal could flicker or not remain lit after the gauge had reached redline. The mere presence of the gauge and dashboard indicator will in most cases cause the driver of the vehicle to rely on the signal being given. However, if a signal is unclear, or gives a false indication that the filter is not yet in need of replacement, serious engine damage could result.

Earlier patents in this area include U.S. Pat. No. 4,369,728, issued to Nelson on Jan. 25, 1983, and U.S. Pat. No. 4,445,456, issued to Nelson on May 1, 1984. However, the signal in the vehicle and the gauge near the engine would not always agree with each other using these prior art devices. Further, the dashboard light would not always remain on until the filter was serviced and the gauge reset. Also, as disclosed, these switches were relatively expensive to manufacture and assemble.

Additionally, prior art indicators have not always been easy to fully reset, sometimes resulting in a gauge that may give a false, premature signal that an air filter requires replacement. This may in turn result in unnecessary filter maintenance.

SUMMARY OF THE INVENTION

The switch gauge of the present invention signals when the air filter of an internal combustion engine requires servicing or replacement by measuring the performance of the filter by measuring the vacuum in the air intake system of the vehicle. The device gives a gradual reading from a clean filter condition to a dirty filter condition and automatically locks into the highest clogged air flow condition experienced during engine operation so that it may be read after shutdown and may also be monitored during engine operation. Furthermore, the device actuates a dashboard mounted light or other signaling device to alert the vehicle operator that the filter has become dirty and requires maintenance or replacement.

An object of the invention is to provide a gauge for indicating that an air filter for a vehicle with an internal combustion engine requires replacement. A further object of the invention is to provide such a gauge that also provides a visual signal to the driver of the vehicle while the vehicle is operational and being driven.

It is a further object of the invention to provide such a gauge that is easily reset after each filter change.

Other objects and advantages of the invention will become apparent from the following detailed description and from the appended drawings in which like numbers have been used to describe like parts throughout the several views.

BRIEF DESCRIPTION OF THE DRAWINGS

FIG. 8 is a horizontal section view taken along line 8—8 of FIG. 5;

FIG. 9 is a perspective view of a switch terminal;

FIG. 10 is a partial side view of a normally open leaf switch;

FIG. 11 is a partial side view of an alternative embodiment showing a normally closed switch;

DETAILED DESCRIPTION OF PREFERRED EMBODIMENTS

Figure 1:
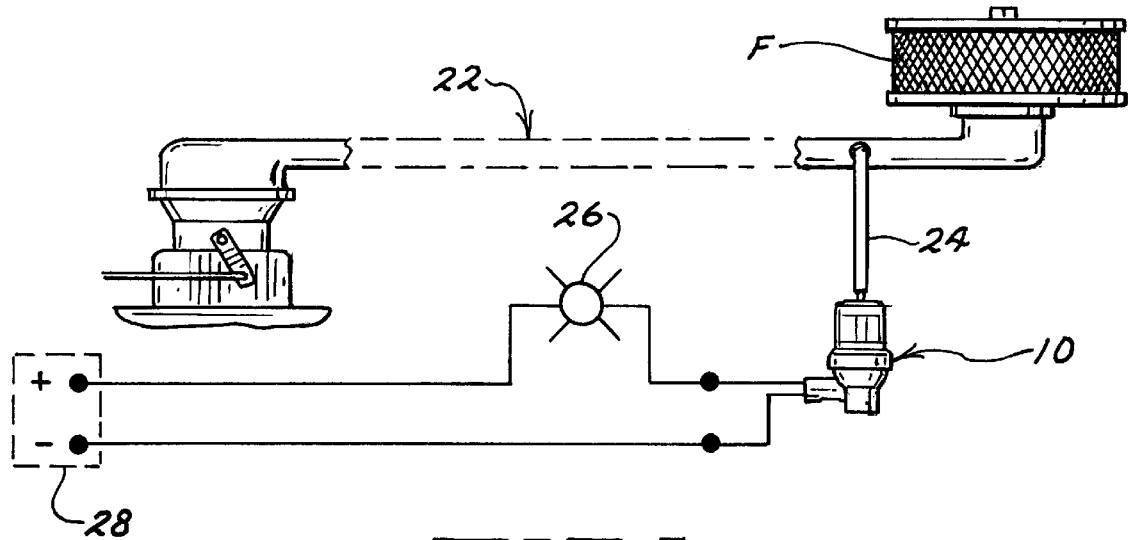
FIG. 1 is a schematic view of an air intake system for an internal combustion engine incorporating the switch gauge of the present invention.
Figure 2:
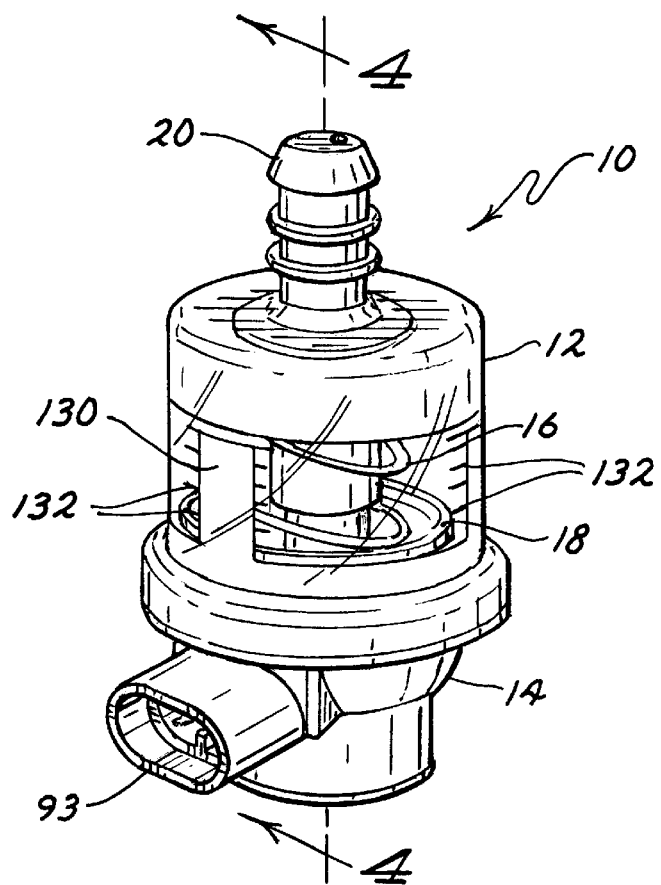
FIG. 2 is a perspective view of the indicating device of the present invention.

With reference to the drawings, and in particular to FIG. 2, switch gauge of the present invention is generally indicated by reference numeral 10. Switch gauge 10 includes a preferably transparent housing 12, a base cap 14, a calibration spring 16 and an indicator cup 18. Housing 12 includes a preferably generally cylindrical attachment member 20 for attachment to air intake system 22 of a vehicle's internal combustion engine, preferably via a tube 24, as shown in FIG. 1.

Referring to FIG. 1, switch gauge 10 is shown schematically attached to a vehicle's air intake system 22, and also electrically attached to a signal means 26. Signal means 26 and switch gauge 10 are both powered by a power source 28, preferably the vehicle's battery. Signal means 26 is preferably a light mounted on the dashboard of the vehicle to provide an indicator to the driver of the vehicle, although other indicators, or combinations of indicators, such as a buzzer, a voice message, or a text message, could also be used to achieve the same result.

Figure 3:
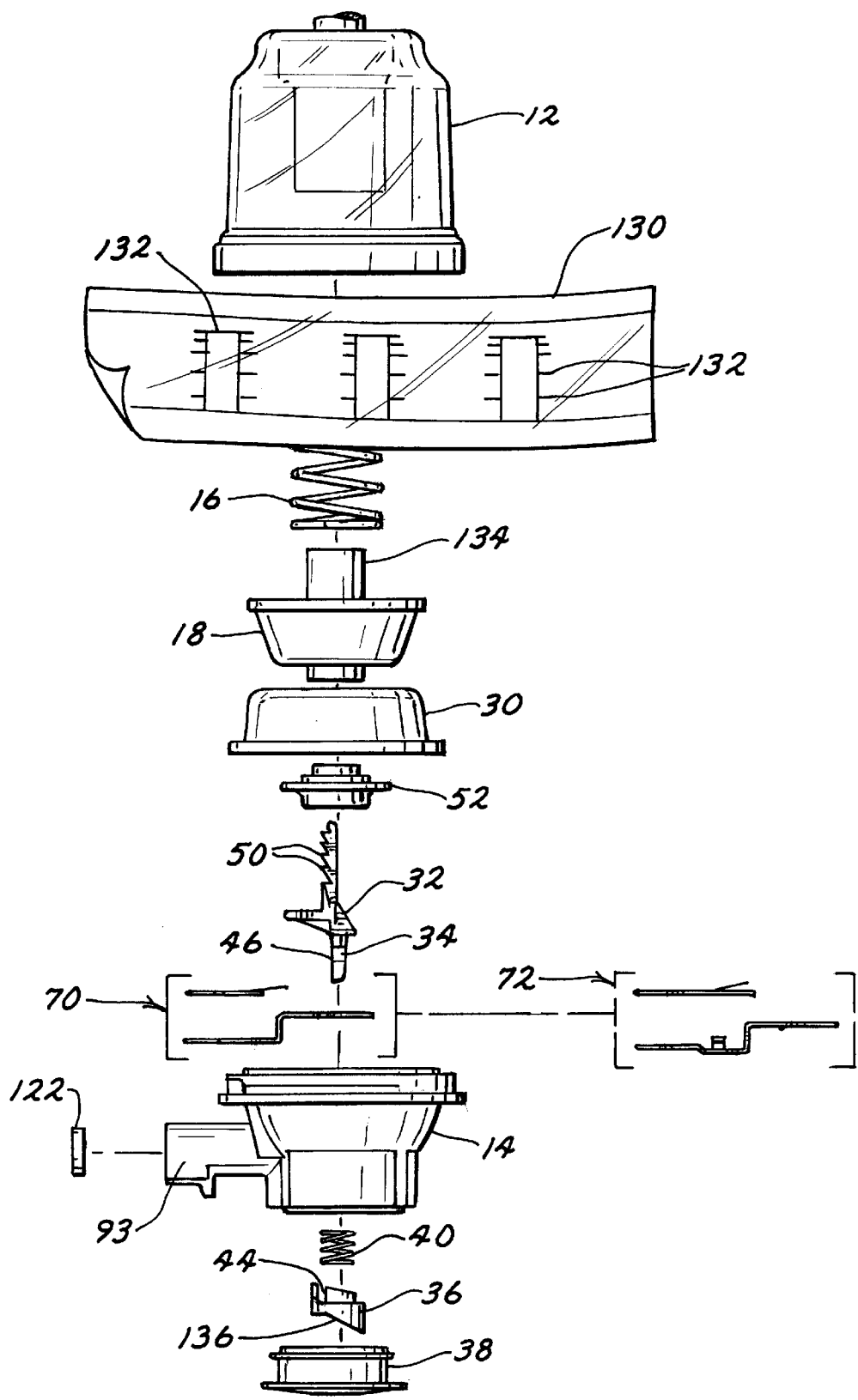
FIG. 3 is an exploded view of the indicating device illustrated in FIG. 2.
Figure 4:
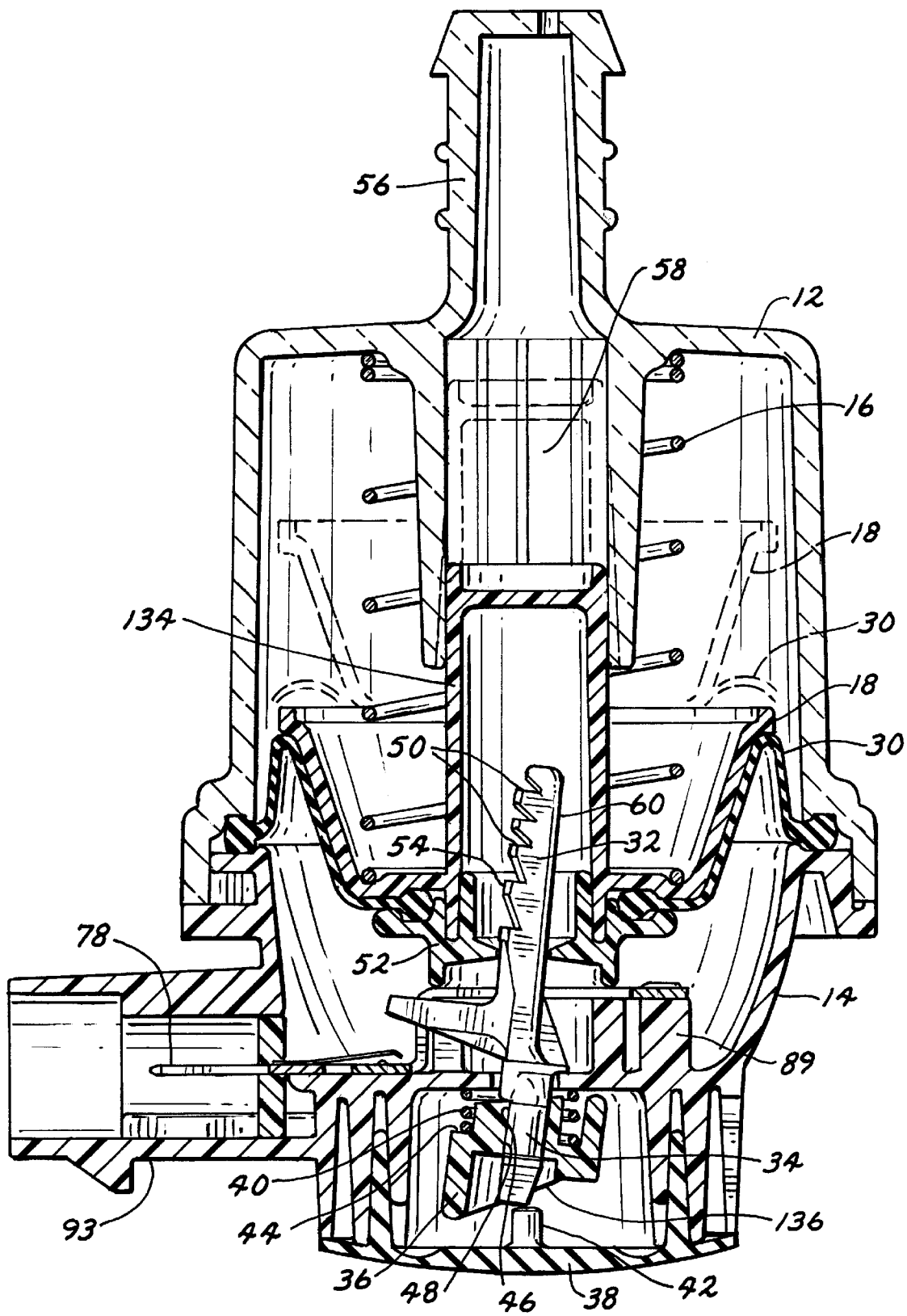
FIG. 4 is a vertical section view of the indicating device taken along line 4—4 of FIG. 2.

Referring to FIGS. 3 and 4, the key components of switch gauge 10 also include the flexible diaphragm 30 and the lockpin 32. Lockpin 32 in turn is pivotally attached to and projecting upwardly from base cap 14. In particular, the base portion 34 of lockpin 32 engages reset button 36, which in turn is actuated by flexible reset cover 38. Reset spring 40 bears against base cap 14 to bias reset button 36 away from base cap 14, in turn ensuring positive contact between optional reset actuator 42 of reset cover 38 and base portion 34 of lockpin 32. Reset button 36 includes a bearing surface 44 which reset spring 40 bears against. It is preferred that base portion 34 of lockpin 32 include a groove along a portion of the diameter thereof (not shown) to permit compression thereof during fitment with reset button 36. Base portion 34 also includes a flat surface 46 which bears against a mating flat inner surface 48 on reset button 36 to insure proper positioning of the two components relative to one another. During assembly, it is also preferable to apply a small amount of adhesive to ensure the permanent retention of base portion 34 within the opening of reset button 36.

Figure 5:
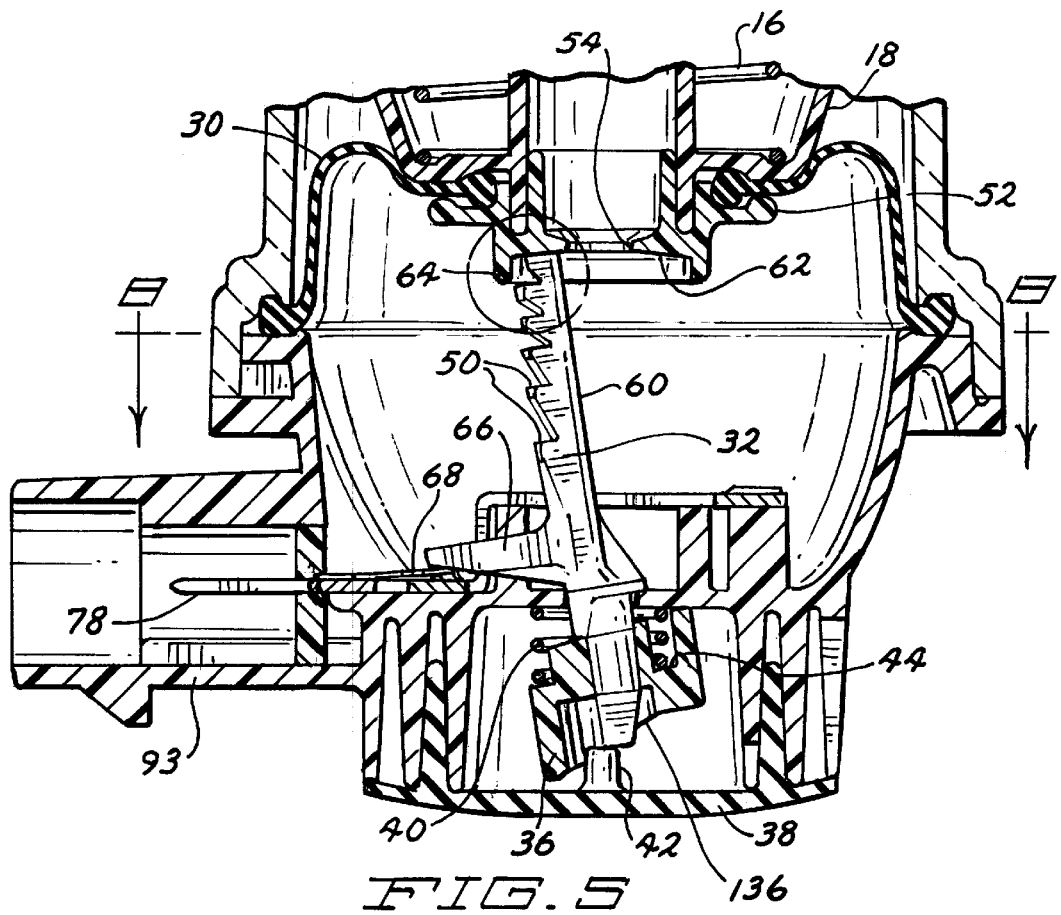
FIG. 5 is a partial section view similar to FIG. 4, showing the lockpin in the locking position.

Lockpin 32 includes several teeth 50 along one side thereof. Teeth 50 are intended for engagement with lock ring 52. In addition to providing permanent attachment of indicator cup 18 to flexible diaphragm 30, lock ring 52 includes an opening 54 in the center thereof through which passes lockpin 32. As shown in FIGS. 4 and 5, the configuration of lockpin 32, combined with the effect of reset spring 40, results in a bias of lockpin 32 generally in the direction of the edge thereof having teeth 50. In other words, the edge of lockpin 32 having teeth 50 tends to bear against central opening 54 of lock ring 52.

Calibration spring 16 bears against the upper, inside surface of housing 12 on one end, and against indicator cup 18 on the other. Nipple member 56 of housing 12 engages tube 24, which in turn intersects air intake 22, which carries air from air inlet F, which encloses the air filter (not shown). As the air filter becomes dirty from extended use, the amount of air passing through it decreases, although the vehicle's internal combustion engine continues to draw air at a steady rate. As the amount of air passing through the filter decreases, there is a corresponding decrease in the air pressure and a resulting vacuum in air intake system 22, resulting in a vacuum inside of the nipple member 56 and the corresponding inwardly projecting inner chamber 58 within housing 12. As this vacuum increases, the negative air pressure gradually overcomes the force of calibration spring 16, and indicator cup 18 is drawn upwards, or toward nipple member 56. As indicator cup 18 is drawing toward nipple member 56, the edge of central opening 54 engages teeth 50 of lockpin 32. Thus, even after the vehicle's engine is turned off, indicator cup 18 is maintained in its prior position.

Figure 7:
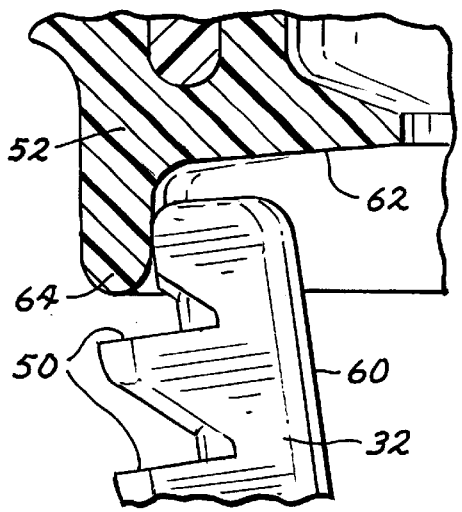
FIG. 7 is a view similar to FIG. 6, showing the lockpin in the locking position.
Figure 6:
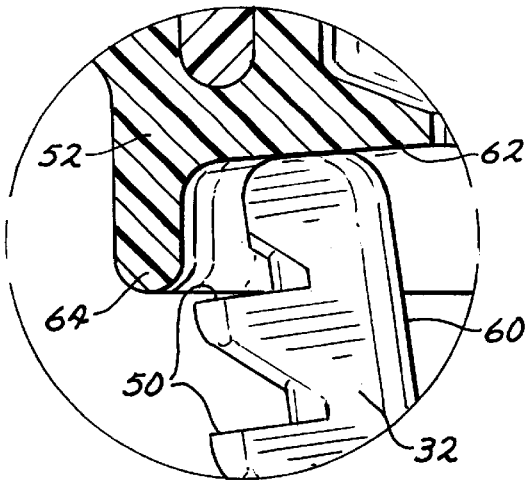
FIG. 6 is a close-up view of the area shown in the broken circle of FIG. 5.

Referring to FIGS. 5–7, as the air filter becomes more dirty, further reducing air flow through the air intake system, calibration spring 16 gradually becomes increasing compressed, as indicator cup 18 is drawn closer to nipple member 56, until lockpin 32 no longer extends into central opening 54 of lock ring 52. Then, as illustrated in FIG. 5, teeth 50 no longer engage central opening 54 of lock ring 52, but rather reset spring 40 urges the distal end of toothed portion 60 of lockpin 32 into contact with the tapered lower surface 62 of lock ring 52. Lock ring 52 also includes a circumferentially projecting skirt 64 that prevents the distal end of toothed portion 60 of lockpin 32 from sliding past the edge of lock ring 52, which in turn, as shall be shown, ensures the simple, reliable resetting of switch gauge 10. As shown in FIG. 7, lock ring skirt 64 extends sufficiently far enough from tapered lower surface 62 to permit additional compression of calibration spring 16 due to the vacuum in air intake system 22 without lockpin 32 sliding past the edge lock ring skirt 64.

When positioned as shown in FIG. 5, reset spring 40 biases lockpin 32 such that the lower surface of switch actuator 66 of lockpin 32 bears down on leaf 68 of normally open switch 70, pushing it against contact 74, closing the circuit illustrated in FIG. 1, resulting in the activation of signal means 26, such as the illumination of a dashboard indicator light. Normally open switch 70 is illustrated in FIG. 10. FIG. 11 shows an alternative embodiment, normally closed switch 72, also employing a leaf 68 which bears against contact 74.

Referring to FIGS. 8–10, leaf 68 is shown as part of switch assembly 76, which includes terminals 78, and connecting strips 80 forming lockpin guiding slot 82. Connecting strips 80 meet to form a distal anchoring portion 84. Leaf 68 is preferably attached as by being mechanically staked to the base portion 86 of switch assembly 76. Base portion 86 and anchoring portion 84 are attached to base cap 14 as by ultrasonic stakes 88, including one mounted on support post 89 (see FIG. 4). Base cap 14 includes posts 90, 92 projecting upwardly therefrom to assure proper positioning of switch assembly 76 thereon. Base cap 14 also includes a connector tunnel 93 through which connection of an output line to switch terminals 78 for activation of signal means 26 is accomplished.

Figure 12:
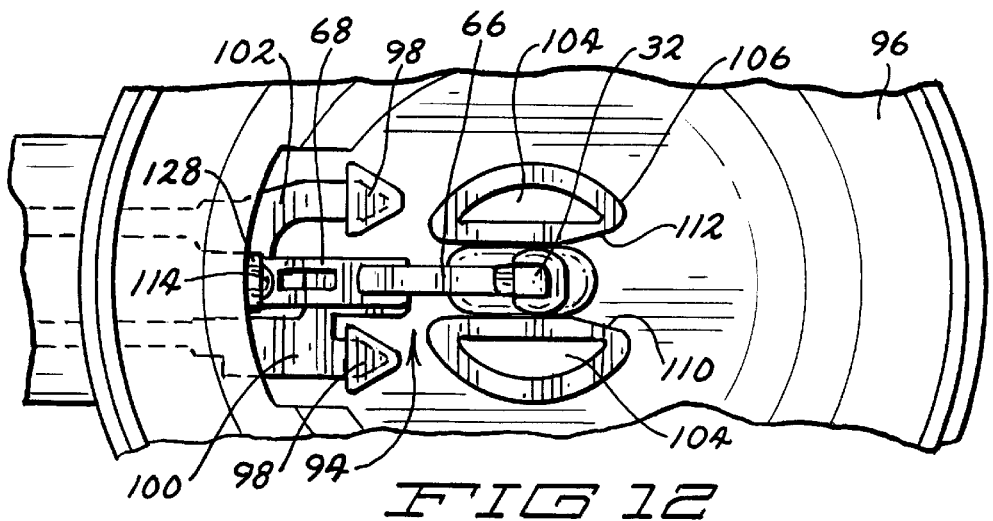
FIG. 12 is a plan view of an alternative embodiment of the terminal/switch assembly.
Figure 13:
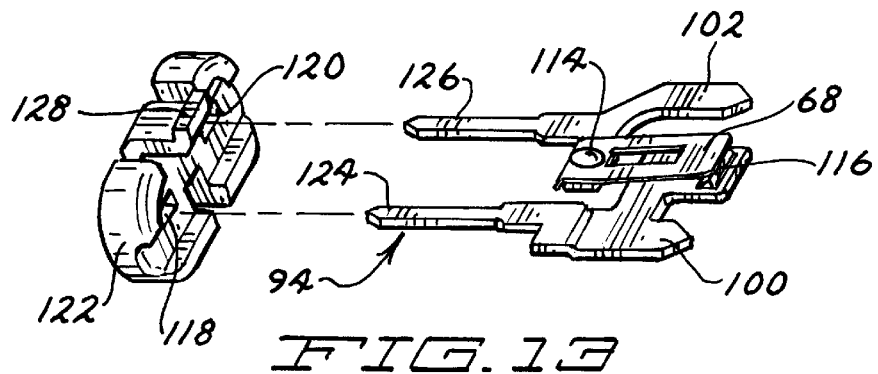
FIG. 13 is a perspective exploded view of the alternative embodiment of the terminal/switch assembly shown in FIG. 12.
Figure 14:
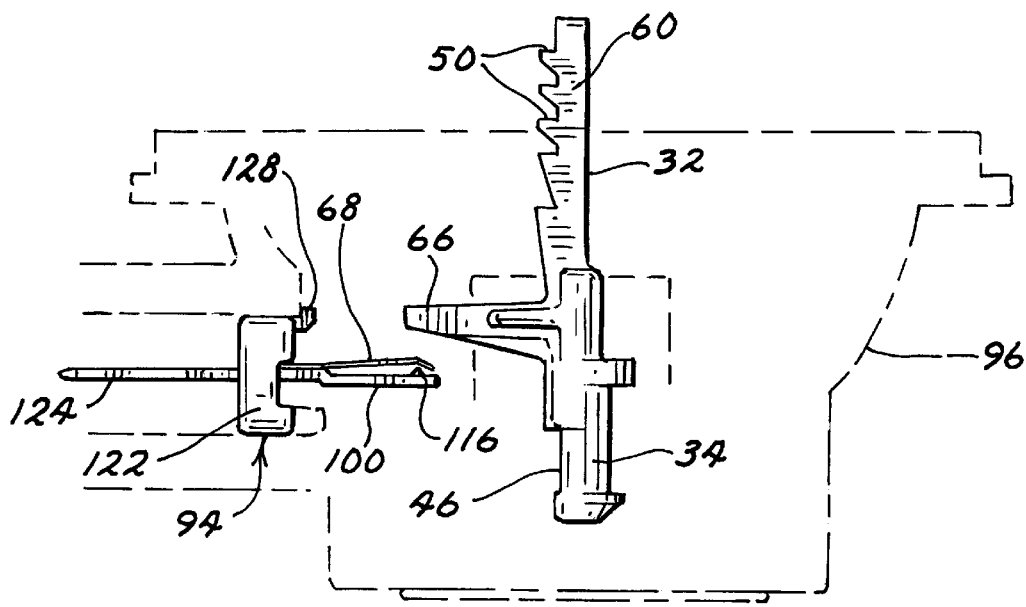
FIG. 14 is a partial side view of the base cap assembly showing the alternative embodiment of the terminal/switch assembly shown in FIG. 12.

Referring to FIGS. 12–14, an alternate and preferred embodiment of a switch assembly 94 is illustrated, using the same switch leaf 68 as switch assembly 76. Used with switch assembly 94 is a slightly modified base cap 96. Base cap 96 preferably includes generally horizontally disposed pockets 98 for receiving first and second retention members 100, 102. The preferably triangularly configured receiving pockets 98, and the corresponding retention members 100, 102, also serve to assure that switch assembly 94 is accurately and consistently positioned on base cap 96. Base cap 96 also preferably includes first and second projecting rib portions 104, 106, with a breather port 108 positioned within first projecting rib portion 106. Projecting rib portions 104, 106 help to limit the side to side motion of lockpin 32 in base cap 96. Rib portions 104, 106 also help align switch actuator portion 66 of lockpin 32 with the leaf 68 of switch assembly 94. Angled surfaces 110, 112 of rib portions 104, 106, respectively, also assist with proper assembly of lockpin 32 in base cap 96.

The configuration of switch assembly 94 preferably includes the fastening of flexible switch leaf 68 as by a rivet 114 to second retention member 102. Leaf 68 is preferably gold plated. Projecting from an affixed to first retention member 100 is contact 116, which is preferably made of platinum. Since they provide the two terminal components of switch assembly 94, it is important that retention members 100, 102 are not in contact with each other following assembly. To this end, each is inserted through a spaced opening 118, 120, respectively, in terminal housing 122, permitting the extension of terminal portions 124, 126 of retention members 100, 102, respectively, therefrom. Also projecting outwardly from terminal housing 122 is retention tab 128 for retaining terminal housing to base cap 96, as shown in FIG. 14.

As may be seen with reference to FIGS. 2 and 4, also shown is a label liner 130 preferably included inside of housing 12, label liner 130 preferably having delineations 132 indicating the condition of the air filter. Delineations 132 preferably indicate levels of vacuum in intake system 22, with a clear marking, preferably in red, indicating when the level has reached a point that the air filter requires maintenance or replacement.

In use, switch gauge 10 may be installed in any orientation that is convenient to the particular application being contemplated, given the various space limitations and the like that may be encountered in various vehicle engine compartments. However, upon installation, an electrical connection is formed between switch gauge 10 and a power supply 28, and then with a signal indicator 26 of some sort, such as a light or buzzer, preferably located on the dashboard of the driving compartment of the vehicle. The electrical connection is formed by plugging into the switch terminals 78 of base cap assembly 14, or terminal portions 124, 126 of base cap assembly 96. The respective terminals are accessible through connector tunnel 93.

When first installed, switch gauge 10 has indicator cup 18 in the position indicated in FIGS. 2 and 4. As the air filter in air inlet F becomes dirtier over time through ongoing use, air flow through intake system 22 is impeded, resulting in a vacuum in the system, which is indicated by the position of indicator cup 18 as it gradually rises to the position indicated in phantom in FIG. 4. As indicator cup 18 gradually rises to the position indicated in phantom in FIG. 4, it is retained in position even when the engine is turned off by the latching of central opening 54 of lock ring 52 on the teeth 50 of lockpin 32. As the force of calibration spring 16 is overcome resulting in its gradual compression, the central cylinder 134 of preferably brightly colored indicator cup 18 is drawn into housing inner chamber 58. Upon reaching this position, as shown in FIG. 5, the toothed portion 60 of lockpin 32 is fully withdrawn from central opening 54 of lock ring 52, whereby the force of reset spring 40 urges switch actuator 66 of lockpin 32 to depress switch leaf 68. Depressing switch leaf 68 causes the actuation of normally open switch 70, or normally closed switch 72, or switch assembly 94, depending on which is installed in switch gauge 10. Actuation of the switch results in activation of signal means 26. The configuration of lock ring 52, including especially the tapered surface 62 and the presence of skirt 64, assures that switch leaf 68 remains depressed, and signal means 26 remains activated, until the air filter is cleaned or replaced, and switch gauge 10 is reset even if the engine is stopped and restarted several times.

To reset switch gauge 10, simply depress reset cover 38 on base cap 14 or 96. Depressing reset cover 38 brings reset actuator 42 into contact with the sloped surface 136 of reset button 36, overcoming the bias of reset spring 40, and centering lockpin 32 on central opening 54 of lock ring 52. Tapered lower surface 62 of lock ring 52 helps assure that the distal end of toothed portion 60 of lockpin 32 is guided to central opening 54 of lock ring 52. As soon as lockpin 32 passes through central opening 54, calibration spring 16 biases indicator cup 18 away from attachment member 20. It should be understood, however, that attachment member 20 need not always be positioned as shown on housing 12, and that its position herein is relied on for convenience.

Those skilled in the art will further appreciate that the present invention may be embodied in other specific forms without departing from the spirit or central attributes thereof. In that the foregoing description of the present invention discloses only exemplary embodiments thereof, it is to be understood that other variations are contemplated as being within the scope of the present invention. Accordingly, the present invention is not limited in the particular embodiments which have been described in detail therein. Rather, reference should be made to the appended claims as indicative of the scope and content of the present invention.

What is claimed is:

1. A restriction indicating device for an air filter used with a vehicle having an internal combustion engine, a power source and a passenger compartment, the restriction indicating device being in fluid communication with the air flowing from the air filter to the air intake of the internal combustion engine, the restriction indicating device comprising:

a housing having an inner chamber;

a base cap assembly attached to said housing;

an attachment member attached to the air intake system of the vehicle, allowing fluid communication of the air intake system with said inner chamber of said housing;

an indicator cup contained within said housing for indicating the vacuum level within said inner chamber of said housing, said indicator cup being slidably positionable between a first position indicating that the air filter is clean and a second position indicating that the air filter is dirty;

a calibration spring biasing said indicator cup toward said first position;

a diaphragm attached to said indicator cup and said housing, dividing the interior of said housing from the interior of said base cap assembly;

a lock ring fixedly attachable to said indicator cup, said lock ring having a central ring and a lower lip;

a lockpin coupled to said base cap assembly, said lockpin having a toothed portion with a plurality of teeth, said lockpin being moveable between a first operating position wherein said lockpin is disengaged from said lock ring, a second operating position wherein any one of said plurality of teeth is releasably engaged with said central ring of said lock ring to retain said indicator cup in a position consistent with the vacuum level of the of said inner chamber of said housing, and a third operating position wherein said toothed portion is disengaged from said central ring and said lockpin engages said lower lip of said lock ring; and a switch assembly actuable with a switch actuator integral with and projecting from said lockpin, said switch assembly actuating an electrical circuit for activating a signal device in the passenger compartment of the vehicle, only when said lockpin is in said third position.

2. The air filter restriction indicating device described in claim 1, further comprising:

a reset assembly, said reset assembly comprising:

a reset button pivotally connected to said base cap assembly and engageable with a lockpin base portion extending from said lockpin; and a reset spring biasing said reset button toward a neutral position, whereby depressing said reset button overcomes the bias of said reset spring, and disengages said central ring of said lock ring from said toothed portion of said lockpin, permitting movement of said indicator cup from said second position to said first position.

3. The air filter restriction indicating device described in claim 1, wherein said switch assembly comprises:

a switch actuator projecting from said lockpin;

a base portion mounted to said base cap assembly;

a flexible leaf portion fixedly attached to and biased away from said base portion, said leaf portion extending outwardly for contact with said switch actuator of said lockpin;

at least one switch terminal attached to and projecting from said base portion for electrical communication with the signaling device in the passenger compartment of the vehicle; and a switch contact fixedly attached to said base portion, for contact with said leaf portion, whereby said switch assembly is normally open, and the loading of the air filter results in said indicator cup moving toward said second position, resulting in said switch actuator bearing against said leaf portion until it contacts said switch contact, closing a circuit energized by the vehicle power source, and thereby actuating said signal device in the passenger compartment of the vehicle.

4. The air filter restriction indicating device described in claim 3, further comprising:

a plurality of posts projecting from said base portion, whereby said posts abut against and engage said base portion to maintain said base portion in fixed position relative to said lockpin switch actuator.

5. The air filter restriction indicating device described in claim 1, wherein said switch assembly comprises:

a switch actuator projecting from said lockpin;

a base portion mounted to said base cap assembly;

a flexible leaf portion fixedly attached to and biased away from said base portion, said leaf portion extending outwardly for contact with said switch actuator of said lockpin;

at least one switch terminal attached to and projecting from said base portion for electrical communication with the signaling device in the passenger compartment of the vehicle; and a switch contact fixedly attached to said base portion, for contact with said leaf portion, whereby said switch assembly is normally closed, and the loading of the air filter results in said indicator cup moving toward said second position, resulting in said switch actuator bearing against said leaf portion until it breaks contact with said switch contact, opening a circuit energized by the vehicle power source, and thereby actuating said signal device in the passenger compartment of the vehicle.

6. The air filter restriction indicating device described in claim 1, wherein said switch assembly comprises:

a switch actuator projecting from said lockpin;

at least one retention member for engagement with an at least one corresponding retention pocket on said base cap assembly, whereby said at least one retention pocket assists in the proper positioning of said switch assembly with respect to said base cap assembly;

a flexible leaf portion fixedly attached to and biased away from said at least one retention member, said leaf portion extending outwardly for contact with said switch actuator of said lockpin;

at least one switch terminal attached to and projecting from said at least one retention member, for electrical communication with the signaling device in the passenger compartment of the vehicle; and a switch contact fixedly attached to said at least one retention member, for contact with said leaf portion, whereby said switch assembly is normally open, and the loading of the air filter results in said indicator cup moving toward said second position, resulting in said switch actuator bearing against said leaf portion until it contacts said switch contact, closing a circuit energized by the vehicle power source, and thereby actuating said signal device in the passenger compartment of the vehicle.

7. The air filter restriction indicating device described in claim 6, further comprising:

a terminal housing including a first aperture for securely receiving one of said at least one switch terminal; and a retention tab projecting from said terminal housing for secure engagement with said base cap assembly.

8. The air filter restriction indicating device described in claim 7, further comprising:

a second switch terminal projecting from a second retention member, said second retention member engageable with a second retention pocket on said base cap assembly; and a second aperture on said terminal housing for securely receiving said second switch terminal.

9. The air filter restriction indicating device described in claim 6, further comprising:

first and second rib portions projecting outwardly from said base cap assembly, whereby said rib portions assure proper positioning of said lockpin with respect to said switch assembly.

10. A restriction indicating device for an air filter used with a vehicle having an internal combustion engine, a power source and a passenger compartment, the restriction indicating device being in fluid communication with the air flowing from the air filter to the air intake of the internal combustion engine, the restriction indicating device comprising:

a housing having an inner chamber;

a base cap assembly attached to said housing;

an attachment member attached to the air intake system of the vehicle, allowing fluid communication of the air intake system with said inner chamber of said housing;

an indicator cup contained within said housing for indicating the vacuum level within said inner chamber of said housing, said indicator cup being slidably and linearly positionable along a first axis, between a first position indicating that the air filter is clean and a second position indicating that the air filter is dirty;

a calibration spring biasing said indicator cup toward said first position;

a diaphragm attached to said indicator cup and said housing, dividing the interior of said housing from the interior of said base cap assembly;

a lockpin pivotally attached to said base cap assembly to allow pivotal movement about a second axis that is perpendicular to said first axis, said lockpin having a toothed portion, said toothed portion thereof being positioned to retain said indicator cup in a position consistent with the vacuum level of said inner chamber of said housing; and a switch assembly actuable with a switch actuator integral with and projecting from said lockpin, said switch assembly actuating an electrical circuit for activating a signal device in the passenger compartment of the vehicle only when said indicator cup has moved along said first axis a sufficient distance to allow the pivotal movement of said switch actuator to pivot into contact with said switch assembly.

11. The air filter restriction indicating device described in claim 10, further comprising:

a lock ring fixedly attachable to said indicator cup, said lock ring having a central ring engageable with said toothed portion of said lockpin and a lower lip engageable with a portion of said lockpin, said toothed portion having a plurality of teeth for releasable engagement with said central ring of said lock ring.

12. The air filter restriction indicating device described in claim 11, wherein said lockpin is moveable between a first operating position wherein said lockpin is disengaged from said lock ring, a second operating position wherein any one of said plurality of teeth is releasably engaged with said central ring of said lock ring, and a third operating position wherein said toothed portion is disengaged from said central ring and said lockpin engages said lower lip of said lock ring.

13. The air filter restriction indicating device described in claim 12 wherein said switch assembly is actuated by said switch actuator only when said lockpin is in said third position.

14. The air filter restriction indicating device described in claim 11, further comprising:
   a reset assembly, said reset assembly comprising:
      a reset button pivotally connected to said base cap assembly and engageable with a lockpin base portion extending from said lockpin; and
      a reset spring biasing said reset button toward a neutral position, whereby depressing said reset button overcomes the bias of said reset spring, and disengages said central ring of said lock ring from said toothed portion of said lockpin, permitting movement of said indicator cup from said second position to said first position.

15. The air filter restriction indicating device described in claim 10, wherein said switch assembly comprises:
   a switch actuator projecting from said lockpin;
   a base portion mounted to said base cap assembly;
   a flexible leaf portion fixedly attached to and biased away from said base portion, said leaf portion extending outwardly for contact with said switch actuator of said lockpin;
   at least one switch terminal attached to and projecting from said base portion for electrical communication with the signaling device in the passenger compartment of the vehicle; and
   a switch contact fixedly attached to said base portion, for contact with said leaf portion, whereby said switch assembly is normally open, and the loading of the air filter results in said indicator cup moving toward a said third position, resulting in said switch actuator bearing against said leaf portion until it contacts said switch contact, closing a circuit energized by the vehicle power source, and thereby actuating said signal device in the passenger compartment of the vehicle.

16. The air filter restriction indicating device described in claim 15, further comprising:
   a plurality of posts projecting from said base portion, whereby said posts abut against and engage said base portion to maintain said base portion in fixed position relative to said lockpin switch actuator.

17. The air filter restriction indicating device described in claim 10, wherein said switch assembly comprises:
   a switch actuator projecting from said lockpin;
   a base portion mounted to said base cap assembly;
   a flexible leaf portion fixedly attached to and biased away from said base portion, said leaf portion extending outwardly for contact with said switch actuator of said lockpin;
   at least one switch terminal attached to and projecting from said base portion for electrical communication with the signaling device in the passenger compartment of the vehicle; and
   a switch contact fixedly attached to said base portion, for contact with said leaf portion, whereby said switch assembly is normally closed, and the loading of the air filter results in said indicator cup moving toward a third position, resulting in said switch actuator bearing against said leaf portion until it breaks contact with said switch contact, opening a circuit energized by the vehicle power source, and thereby actuating said signal device in the passenger compartment of the vehicle.

18. The air filter restriction indicating device described in claim 10, wherein said switch assembly comprises:
   a switch actuator projecting from said lockpin;
   at least one retention member for engagement with an at least one corresponding retention pocket on said base cap assembly, whereby said at least one retention pocket assists in the proper positioning of said switch assembly with respect to said base cap assembly;
   a flexible leaf portion fixedly attached to and biased away from said at least one retention member, said leaf portion extending outwardly for contact with said switch actuator of said lockpin;
   at least one switch terminal attached to and projecting from said at least one retention member, for electrical communication with the signaling device in the passenger compartment of the vehicle; and
   a switch contact fixedly attached to said at least one retention member, for contact with said leaf portion, whereby said switch assembly is normally open, and the loading of the air filter results in said indicator cup moving toward said second position, resulting in said switch actuator bearing against said leaf portion until it contacts said switch contact, closing a circuit energized by the vehicle power source, and thereby actuating said signal device in the passenger compartment of the vehicle.

19. The air filter restriction indicating device described in claim 18, further comprising:
   a terminal housing including a first aperture for securely receiving one of said at least one switch terminal; and
   a retention tab projecting from said terminal housing for secure engagement with said base cap assembly.

20. The air filter restriction indicating device described in claim 19, further comprising:
   a second switch terminal projecting from a second retention member, said second retention member engageable with a second retention pocket on said base cap assembly, and
   a second aperture on said terminal housing for securely receiving said second switch terminal.

21. The air filter restriction indicating device described in claim 18, further comprising:
   first and second rib portions projecting outwardly from said base cap assembly, whereby said rib portions assure proper positioning of said lockpin with respect to said switch assembly.

* * * * *